(12) United States Patent
Robbins (10) Patent No.: US 9,241,074 B1
(45) Date of Patent: Jan. 19, 2016

(54) METHOD AND SYSTEM FOR PROVIDING VARIABLE DIAL PATTERN PROVISIONING IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1508 days.

(21) Appl. No.: 11/534,281

(22) Filed: Sep. 22, 2006

Related U.S. Application Data (60) Provisional application No. 60/719,465, filed on Sep. 22, 2005.

(51) Int. Cl.
| | |
|---|---|
| H04L 12/28 | (2006.01) |
| H04L 12/50 | (2006.01) |
| H04L 12/66 | (2006.01) |
| H04M 3/00 | (2006.01) |
| H04M 1/00 | (2006.01) |
| H04M 7/00 | (2006.01) |
| H04N 1/27 | (2006.01) |

(52) U.S. Cl.
CPC .......... *H04M 7/006* (2013.01); *H04N 1/27* (2013.01)

(58) Field of Classification Search
None
See application file for complete search history.

(56) References Cited

U.S. PATENT DOCUMENTS

| | | | |
|---|---|---|---|
| 3,737,587 A | 6/1973 | Romero | |
| 4,125,872 A * | 11/1978 | Maxwell | H04M 1/27 379/357.04 |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A | 11/1992 | Borcherding | |
| 5,255,314 A | 10/1993 | Applegate et al. | |
| 5,323,444 A | 6/1994 | Ertz et al. | |
| 5,471,519 A | 11/1995 | Howe et al. | |
| 5,475,745 A | 12/1995 | Boyle | |
| 5,619,561 A | 4/1997 | Reese | |
| 5,758,284 A | 5/1998 | Chavez, Jr. et al. | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A * | 12/1999 | Lin et al. .................. 379/207.02 | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A | 6/2000 | Haber et al. | |
| 6,208,726 B1 | 3/2001 | Bansal et al. | |
| 6,219,414 B1 | 4/2001 | Maciejewski et al. | |

(Continued)

OTHER PUBLICATIONS

Rosenberg et al. "RFC 3261, SIP: Session Initiation Protocol", Jun. 2002.

(Continued)

*Primary Examiner* — Christopher Crutchfield
*Assistant Examiner* — Thinh Tran (57) ABSTRACT

A system and method may provide identifying an initialization signal, receiving one or more pattern elements after identifying the initialization signal, and analyzing the one or more pattern elements based on an identified dialing plan to determine whether the one or more pattern elements correspond to a complete address. The system and method also may provide identifying that the one or more pattern elements or a subsequence of the one or more pattern elements are associated with a command.

20 Claims, 5 Drawing Sheets

(56) References Cited

U.S. PATENT DOCUMENTS

| | | |
|---|---|---|
| 6,337,898 B1 | 1/2002 | Gordon |
| 6,339,639 B1 | 1/2002 | Henderson |
| 6,404,876 B1 | 6/2002 | Smith et al. |
| 6,453,040 B1 | 9/2002 | Burke et al. |
| 6,484,196 B1 | 11/2002 | Maurille |
| 6,510,315 B1 | 1/2003 | Arnson |
| 6,636,594 B1* | 10/2003 | Oran ............... 379/201.01 |
| 6,735,295 B1 | 5/2004 | Brennan et al. |
| 6,741,695 B1 | 5/2004 | McConnell et al. |
| 6,744,877 B1 | 6/2004 | Edwards |
| 6,754,325 B1 | 6/2004 | Silver et al. |
| 6,801,604 B2 | 10/2004 | Maes et al. |
| 6,807,259 B1 | 10/2004 | Patel et al. |
| 6,826,174 B1* | 11/2004 | Erekson ............... H04M 1/2535 370/352 |
| 6,834,048 B1 | 12/2004 | Cho et al. |
| 6,856,616 B1 | 2/2005 | Schuster et al. |
| 6,857,072 B1 | 2/2005 | Schuster et al. |
| 6,870,830 B1 | 3/2005 | Schuster et al. |
| 6,876,632 B1 | 4/2005 | Takeda |
| 6,879,673 B2 | 4/2005 | Creamer et al. |
| 6,954,521 B2 | 10/2005 | Bull et al. |
| 6,954,524 B2 | 10/2005 | Gibson |
| 6,961,332 B1 | 11/2005 | Li et al. |
| 6,963,633 B1 | 11/2005 | Diede et al. |
| 6,965,614 B1 | 11/2005 | Osterhout et al. |
| 6,985,961 B1 | 1/2006 | Ramsayer et al. |
| 6,996,605 B2 | 2/2006 | Low et al. |
| 7,020,130 B2 | 3/2006 | Krause et al. |
| 7,031,700 B1 | 4/2006 | Weaver et al. |
| 7,039,710 B2 | 5/2006 | Khartabil |
| 7,050,559 B2 | 5/2006 | Silver et al. |
| 7,082,193 B2 | 7/2006 | Barclay et al. |
| 7,085,253 B2 | 8/2006 | Yang |
| 7,123,707 B1 | 10/2006 | Hiri et al. |
| 7,130,282 B2 | 10/2006 | Black |
| 7,145,997 B2 | 12/2006 | Poikselka et al. |
| 7,203,293 B1 | 4/2007 | Bedingfield |
| 7,224,792 B2 | 5/2007 | Fusco |
| 7,257,837 B2 | 8/2007 | Xu et al. |
| 7,260,201 B2 | 8/2007 | Jorasch et al. |
| 7,274,662 B1 | 9/2007 | Kalmane et al. |
| 7,283,517 B2 | 10/2007 | Yan et al. |
| 7,290,288 B2 | 10/2007 | Gregg et al. |
| 7,295,577 B2 | 11/2007 | Moody et al. |
| 7,301,913 B2 | 11/2007 | Corrao et al. |
| 7,406,696 B2* | 7/2008 | Burger et al. ............... 719/318 |
| 7,426,265 B2 | 9/2008 | Chen et al. |
| 7,440,440 B1 | 10/2008 | Abichandani et al. |
| 7,460,657 B1 | 12/2008 | Baeza |
| 7,489,771 B2 | 2/2009 | McMurry et al. |
| 7,564,846 B2 | 7/2009 | Dezonno et al. ............... 370/352 |
| 7,580,497 B2 | 8/2009 | Wang et al. |
| 7,587,031 B1 | 9/2009 | Ress et al. |
| 7,593,389 B2* | 9/2009 | Vance ............... 370/352 |
| 7,599,355 B2 | 10/2009 | Sunstrum |
| 7,602,901 B1 | 10/2009 | Kates et al. |
| 7,609,700 B1 | 10/2009 | Ying et al. |
| 7,609,706 B2 | 10/2009 | Scott et al. |
| 7,630,481 B2 | 12/2009 | Kafka |
| 7,711,810 B2 | 5/2010 | McKinnon et al. |
| 7,715,413 B2 | 5/2010 | Vaziri et al. |
| 7,743,141 B2 | 6/2010 | Wang et al. |
| 7,751,536 B1 | 7/2010 | Abramson et al. |
| 7,773,581 B2 | 8/2010 | Punj et al. |
| 7,813,490 B2 | 10/2010 | DeMent et al. |
| 7,849,205 B2 | 12/2010 | Pounds et al. |
| 7,860,089 B2 | 12/2010 | Tripathi et al. |
| 8,036,360 B1 | 10/2011 | Gogineni et al. |
| 8,059,805 B2 | 11/2011 | Claudatos et al. |
| 8,116,302 B1 | 2/2012 | Robbins |
| 8,379,824 B2 | 2/2013 | Jackson et al. |
| 2002/0038388 A1 | 3/2002 | Netter |
| 2002/0075305 A1 | 6/2002 | Beaton et al. |
| 2002/0114318 A1 | 8/2002 | Rines |
| 2002/0131447 A1 | 9/2002 | Krishnamurthy et al. |
| 2002/0136359 A1* | 9/2002 | Stumer et al. ............... 379/37 |
| 2002/0136363 A1 | 9/2002 | Stumer et al. |
| 2002/0137495 A1 | 9/2002 | Gabrysch |
| 2002/0141548 A1 | 10/2002 | Boda |
| 2002/0156900 A1 | 10/2002 | Marquette et al. |
| 2003/0007483 A1 | 1/2003 | Um |
| 2003/0028806 A1 | 2/2003 | Govindarajan et al. |
| 2003/0043992 A1 | 3/2003 | Wengrovitz |
| 2003/0088421 A1 | 5/2003 | Maes et al. |
| 2003/0231759 A1 | 12/2003 | Bedingfield, Sr. et al. |
| 2004/0004942 A1 | 1/2004 | Nebiker et al. |
| 2004/0030750 A1 | 2/2004 | Moore et al. |
| 2004/0037403 A1 | 2/2004 | Koch |
| 2004/0051900 A1 | 3/2004 | Sagiya et al. |
| 2004/0082324 A1 | 4/2004 | Ayoub |
| 2004/0090954 A1 | 5/2004 | Zhang et al. |
| 2004/0148395 A1 | 7/2004 | Schulzrinne |
| 2004/0174983 A1 | 9/2004 | Olschwang et al. |
| 2004/0207724 A1 | 10/2004 | Crouch et al. |
| 2004/0240650 A1 | 12/2004 | Bear et al. |
| 2004/0241656 A1 | 12/2004 | Jan et al. |
| 2004/0243680 A1 | 12/2004 | Mayer |
| 2004/0249951 A1 | 12/2004 | Grabelsky et al. |
| 2004/0264406 A1 | 12/2004 | Pattenden et al. |
| 2005/0013421 A1 | 1/2005 | Chavez et al. |
| 2005/0043014 A1 | 2/2005 | Hodge |
| 2005/0069104 A1* | 3/2005 | Hanson et al. ............... 379/88.19 |
| 2005/0078642 A1 | 4/2005 | Mayer et al. |
| 2005/0123104 A1 | 6/2005 | Bishop et al. |
| 2005/0129219 A1 | 6/2005 | Williamson |
| 2005/0147227 A1 | 7/2005 | Chervirala et al. |
| 2005/0190721 A1 | 9/2005 | Pershan |
| 2005/0193338 A1 | 9/2005 | Hawkins et al. |
| 2005/0195802 A1 | 9/2005 | Klein et al. |
| 2005/0201530 A1 | 9/2005 | Koch et al. |
| 2005/0213716 A1 | 9/2005 | Zhu et al. |
| 2005/0215243 A1 | 9/2005 | Black et al. |
| 2005/0226217 A1 | 10/2005 | Logemann et al. |
| 2005/0237978 A1 | 10/2005 | Segal |
| 2005/0249196 A1 | 11/2005 | Ansari et al. |
| 2005/0286466 A1 | 12/2005 | Tagg et al. |
| 2006/0023658 A1 | 2/2006 | Phillips et al. |
| 2006/0033809 A1 | 2/2006 | Farley |
| 2006/0039389 A1 | 2/2006 | Burger et al. |
| 2006/0050648 A1 | 3/2006 | Eydelman |
| 2006/0050682 A1 | 3/2006 | Vance |
| 2006/0062210 A1 | 3/2006 | Dharanikota |
| 2006/0062251 A1 | 3/2006 | Lim et al. |
| 2006/0067300 A1 | 3/2006 | Poustchi et al. |
| 2006/0067504 A1 | 3/2006 | Goldman et al. |
| 2006/0140379 A1 | 6/2006 | Yamamoto et al. |
| 2006/0140380 A1 | 6/2006 | Croak et al. |
| 2006/0146737 A1 | 7/2006 | Sandgren et al. |
| 2006/0153342 A1 | 7/2006 | Sasaki |
| 2006/0165060 A1 | 7/2006 | Dua |
| 2006/0177030 A1 | 8/2006 | Rajagopalan et al. |
| 2006/0177044 A1 | 8/2006 | O'Neil et al. |
| 2006/0178130 A1 | 8/2006 | Makrygiannis |
| 2006/0203986 A1 | 9/2006 | Gibson |
| 2006/0218283 A1 | 9/2006 | Jones et al. |
| 2006/0221176 A1 | 10/2006 | Di Pietro et al. |
| 2006/0251229 A1 | 11/2006 | Gorti et al. |
| 2006/0268750 A1* | 11/2006 | Weiner ............... H04M 3/56 370/260 |
| 2006/0285533 A1 | 12/2006 | Divine et al. |
| 2006/0286984 A1 | 12/2006 | Bonner |
| 2007/0025270 A1 | 2/2007 | Sylvain |
| 2007/0058613 A1 | 3/2007 | Beckemeyer |
| 2007/0058637 A1 | 3/2007 | Lo |
| 2007/0083658 A1 | 4/2007 | Hanna et al. |
| 2007/0092073 A1 | 4/2007 | Olshansky et al. |
| 2007/0111723 A1 | 5/2007 | Ahmed et al. |
| 2007/0127660 A1 | 6/2007 | Roberts et al. |
| 2007/0143858 A1 | 6/2007 | Hearty |
| 2007/0147601 A1 | 6/2007 | Tischer |

(56) References Cited

U.S. PATENT DOCUMENTS

2007/0280469 A1* 12/2007 Baker et al. .................. 379/350
2008/0049724 A1   2/2008 Tsujino et al.
2008/0126549 A1   5/2008 Khanchandani et al.

OTHER PUBLICATIONS

Newton's Telecom Dictionary 22nd Edition, p. 829, Feb. 2006.
Sparks, "RFC 3515, The Session Initiation Protocol (SIP) Refer Method," Apr. 2003.
Biggs et al., "RFC 3891, The Session Initiation Protocol (SIP) 'Replaces' Header," Feb. 2004.
Mahy et al., "RFC 3911, The Session Initiation Protocol (SIP) 'Join' Header," Feb. 2004.
"GR-1298-CORE-AINGR: Switching Systems," Telcordia Technologies, Issue 6, Nov. 2000.
Mahy et al., "draft-ietf-sip-replaces-05—The Session Initiation Protocol (SIP) "Replaces" Header," The Internet Society, Feb. 16, 2004.
Rosenberg et al., "draft-ietf-sipping-dialog-package-04—An INVITE Initiated Dialog Event Package for the Session Initiation Protocol (SIP)," The Internet Society, Feb. 13, 2004.
Lingle et al., "draft-ietf-sip-mib-08—Management Information Base for Session Initiation Protocol (SIP)," The Internet Society, Jul. 16, 2004.
Johnston et al., "draft-ietf-sipping-cc-conferencing-04—Session Initiation Protocol Call Control—Conferencing for User Agents," The Internet Society, Jul. 18, 2004.
Sparks et al., "draft-ietf-sipping-cc-transfer-02—Session Initiation Protocol Call Control—Transfer," The Internet Society, Feb. 15, 2004.
Rosenberg et al., "draft-ietf-sipping-conference-package-04—A Session Initiation Protocol (SIP) Event Package for Conference State," The Internet Society, May 21, 2004.
Petrie, "draft-ietf-sipping-config-framework-04—A Framework for Session Initiation Protocol User Agent Profile Delivery," The Internet Society,.
"SR-3065: LSSGR Guide," Telcordia Technologies, Issue 7, Aug. 2003.
"SR-504: SPCS Capabilities and Features," Telcordia Technologies, Issue 1, Mar. 1996.
Mahy, "RFC 3842—A Message Summary and Message Waiting Indication Event Package for the Session Initiation Protocol (SIP)," The Internet Society, Aug. 2004.
Rosenberg et al., "RFC 3840—Indicating User Agent Capabilities in the Session Initiation Protocol (SIP)," The Internet Society, Aug. 2004.
Harrington et al., "RFC 3411—An Architecture for Describing Simple Network Management Protocol (SNMP) Management Frameworks," The Internet Society, Dec. 2002.
Jennings et al., "RFC 3325—Private Extensions to the Session Initiation Protocol (SIP) for Asserted Identity within Trusted Networks," The Internet Society, Nov. 2002.
Schulzrinne, "draft-ietf-sipping-sos-00—Emergency Services URI for the Session Initiation Protocol," The Internet Society, Feb. 8, 2004.
Rosenberg et al., "RFC 3262—Reliability of Provisional Responses in the Session Initiation Protocol (SIP)," The Internet Society, Jun. 2002.
Rosenberg, "RFC 3311—The Session Initiation Protocol (SIP) Update Method," The Internet Society, Sep. 2002.
Mahy et al., "draft-ietf-sipping-cc-framework-03—A Call Control and Multi-party usage framework for the Session Initiation Protocol (SIP)," The Internet Society, Oct. 27, 2003.
Mahy et al., "draft-ietf-sip-join-03—The Session Initiation Protocol (SIP) "Join" Header," The Internet Society, Feb. 2004.
Schulzrinne et al., "RFC 2833—RTP Payload for DTMF Digits, Telephony Tones and Telephony Signals," The Internet Society, May 2000.
Schulzrinne et al., "RFC 1889—RTP: A Transport Protocol for Real-Time Applications," The Internet Society, Jan. 1996.
Handley et al., "RFC 2327—SDP: Session Description Protocol," The Internet Society, Apr. 1998.
"Cisco CailManager Features and Services Guide, Release 4.1(3)—Multilevel Precedence and Preemption," Cisco Systems, Inc., http://www.cisco.com/en/US/products/sw/voicesw/ps556/products_administration_guide . . . , three pages, Copyright 2005.
"IP Office, Do Not Disturb," Carroll Communications, Inc., www.carrollcommunications.com/ipoffice/5donotdisturb.html, one page, Copyright 2008.
Petrie, "A Framework for Session Initiation Protocol User Agent Profile Delivery, draft-ieff-sipping-config-framework-04.txt," Pingtel Corp., SIPPING Working Group, The Internet Society, 34 pages, Jul. 19, 2004.

* cited by examiner

METHOD AND SYSTEM FOR PROVIDING VARIABLE DIAL PATTERN PROVISIONING IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a packet switched and/or packet-based network such as a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and method of an exemplary embodiment of the present invention may provide identifying an initialization signal, receiving one or more pattern elements after identifying the initialization signal, and analyzing the one or more pattern elements based on an identified dialing plan to determine whether the one or more pattern elements correspond to a complete address. The system and method also may provide identifying that the one or more pattern elements or a subsequence of the one or more pattern elements are associated with a command.

The term "module," as used herein, may refer to hardware, software, firmware, and/or combinations thereof.

Figure 1:
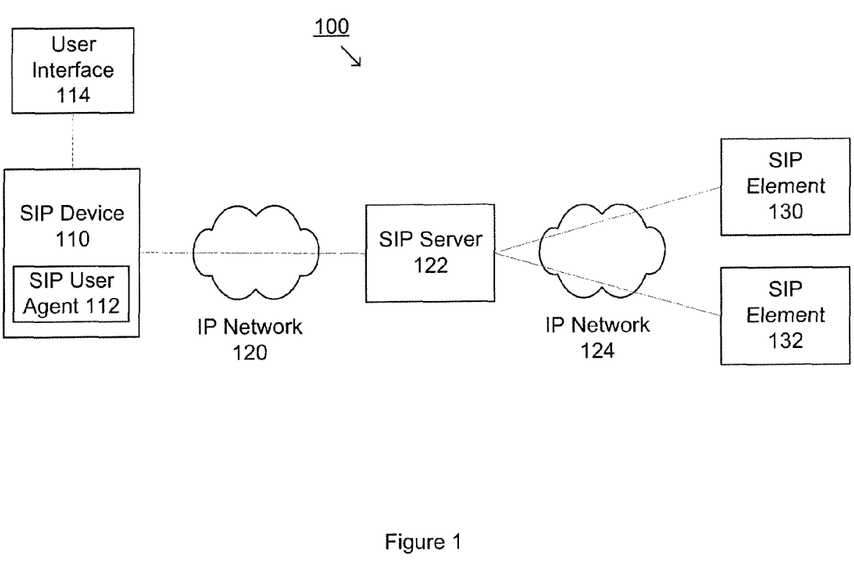
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular for provisioning for variable dial pattern provisioning. As illustrated, SIP Device 110 may be coupled to User Interface 114. SIP Device 110 may include a SIP User Agent 112 for communicating across JP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may be an interface device that communicates through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Elements 130 and 132 may also represent a PSTN device that may be reached by a gateway that, directly or indirectly, acts as a SIP User Agent.

Figure 2:
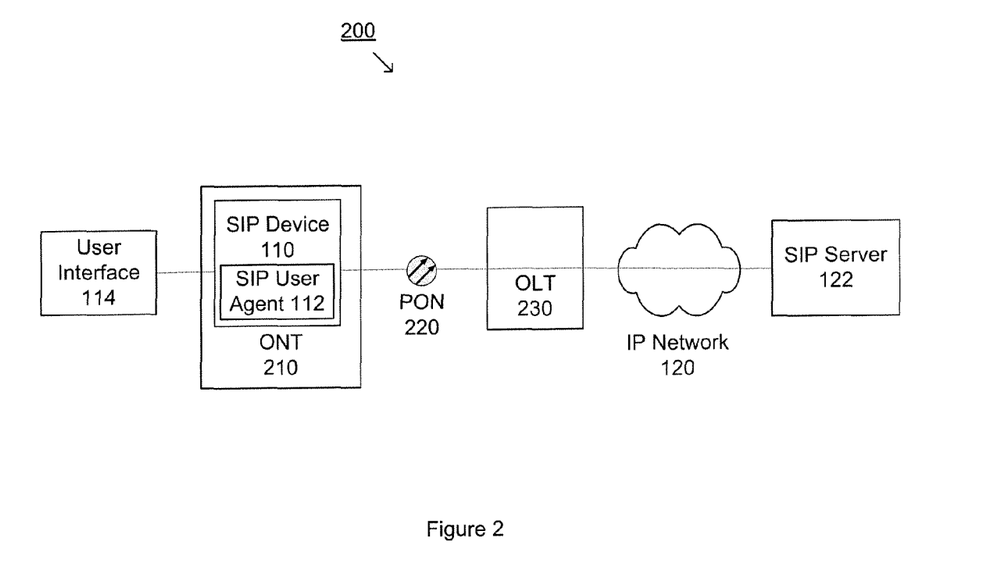
FIG. 2 illustrates an exemplary implementation where a SIP Device is used in connection with a FTTP network, according to an embodiment of the present invention.
Figure 3:
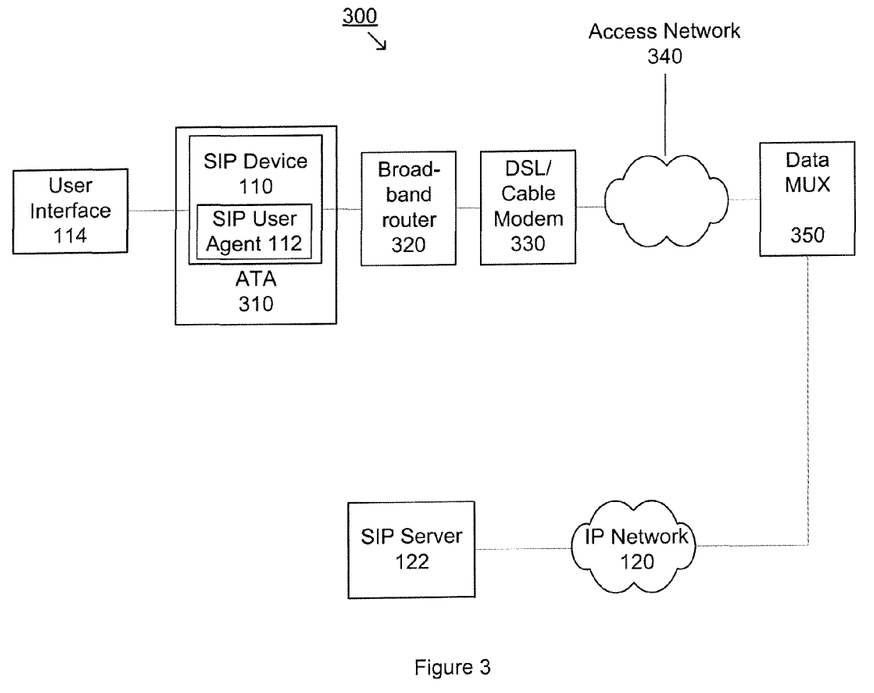
FIG. 3 illustrates an exemplary implementation where a SIP Device is embedded in an Analog Telephone Adapter (ATA) connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IF network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

Session Initiation Protocol (SIP) is the messaging standard employed by many VoIP systems to establish and control calling sessions over the IP network. Several issues exist in using conventional messaging standards, such as SIP, in communicating analog signals over a data network. First, conventional messaging standards do not provide for emulating the dialing behavior of the existing phone network when using conventional analog devices. For example, the familiar "dial tone" is normally provided by switches in the PSTN when an analog phone goes "off-hook."

Second, conventional messaging standards do not provide for dialed number recognition to emulate telephony network services when interacting with conventional analog devices, such as an analog telephone. In the PSTN, once an "off-hook" condition is detected, a PSTN switch that serves the off-hook line expects to receive a pattern of dialed-digit signaling (e.g., DTMF tones), which is then interpreted to determine the desired calling destination, service, or request. For example, a PSTN switch may understand that once the dialed digits 1-8-0-0-5-5-5-1-2-1-2 have been received, the PSTN switch has the information to route the call request to the intended destination. Likewise, the PSTN switch may recognize that once the dialed digits 9-1-1 have been received, the switch has the information to route the call request to an emergency services call center.

Problems exist since conventional messaging standards do not support automatic recognition of dialed digits from conventional telephones at, for example, the SIP Device 110. This problem is particularly challenging when communicating analog signals, such as, but not limited to, voice, over data networks since there are numerous variations in dialing patterns, which may vary from country to country, state to state, company to company, service provider to service provider, etc. Included herein is a system and method for solving this and other problems in variable dial pattern provisioning.

Figure 4:
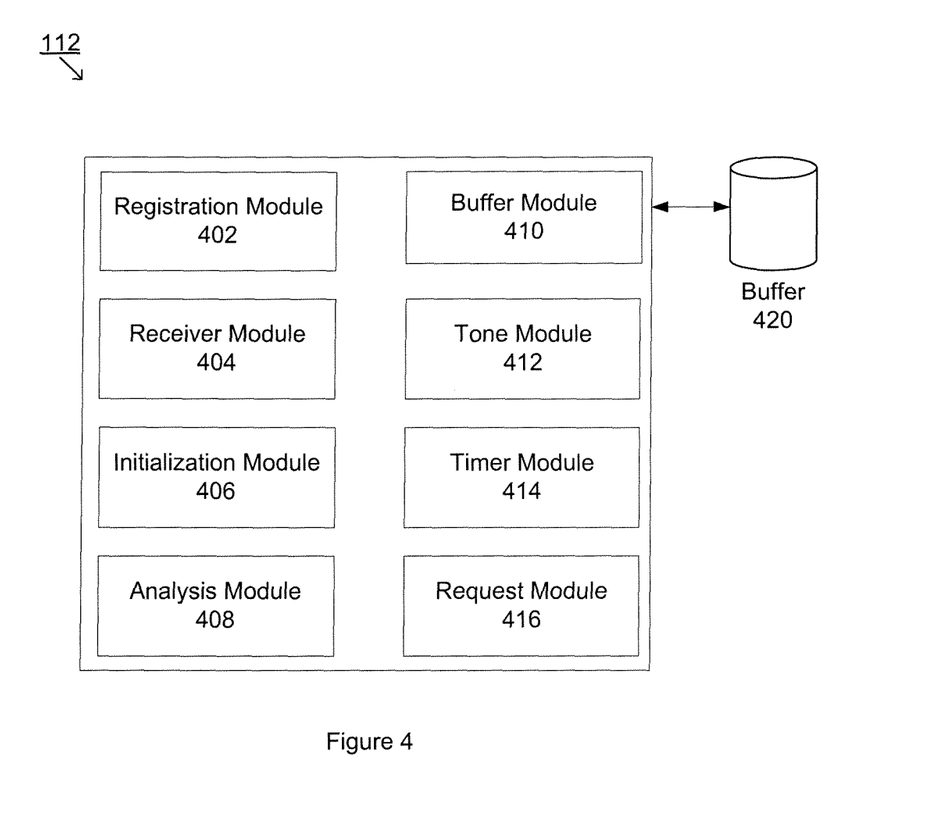
FIG. 4 is an exemplary embodiment of various modules included in a SIP User Agent, according to an embodiment of the present invention.

FIG. 4 illustrates an exemplary embodiment of various modules included in the SIP User Agent 112 for variable dial pattern provisioning, according to an embodiment of the present invention. In an exemplary embodiment, the SIP User Agent 112 may process analog information received from the User Interface 114 and may communicate with the SIP Server 122 to set up a data session across the IP network 124 based on the processed analog information. The data session may be a SIP dialog, for example. The SIP Server 122 may establish a data session between the SIP User Agent 112 and the SIP Element 130 for communicating information over the IP network 124, for example. For processing the analog information and interacting with the SIP Server 122, the SIP User Agent 112 may include a registration module 402, a receiver module 404, an initialization module 406, an analysis module 408, a buffer module 410, a tone module 412, a timer module 414, and a request module 416. The SIP User Agent 112 also may be communicatively coupled to buffer 420. It is noted that the modules 402-416 are exemplary. Other modules may be included in the SIP User Agent 112. In addition, the modules 402-416 may be combined, integrated, and/or duplicated to support various applications. Further, the modules 402-416 may be implemented across multiple User Agents and/or other components.

Before initiating a data session, the registration module 402 of the SIP User Agent 112 may query the SIP Server 122 for a dialing plan and may receive the dialing plan. The registration module 402 may forward the dialing plan to the analysis module 408 for analyzing received analog information. Also, the dialing plan may be stored locally at the analysis module 408 when the analysis module 408 is created.

The analog information may include a series of one or more pattern elements received at the SIP User Agent 112 from the User Interface 114. The analog information may, for example, include a voice signal, a facsimile signal, analog signals representing one or more pattern elements, initialization signals, and/or combinations thereof. In an exemplary embodiment, the initialization signals may be information signaling that the User Interface 114 is attempting to set up a data session. For example, the initialization signal may be an "off-hook" signal transmitted by a telephone when a user removes a telephone receiver from a telephone base at the User Interface 114. In an exemplary embodiment, each analog signal representing a pattern element may be a signal corresponding to a Dual-Tone Multi-Frequency (DTMF) signal. Each pattern element may be a DTMF signal corresponding to DTMF tones 1-9, A-D, '*', or '#,' for example. Also, each pattern element may be a pulse dialing signal. Other analog signals representing other data schemes also may be used, as are well known. To set up a data session across the IP network 124, the SIP User Agent 112 may analyze the received pattern elements based on the dialing plan.

The dialing plan may be a computer program pattern language of one or matching rules for determining whether analog information received from the User Interface 114 corresponds to a complete address. The SIP User Agent 112 may determine, based on the dialing plan, whether the received pattern elements partially or completely match a format of a complete address, which may be used to identify an entity on the IP network 124. The complete address may be a destination address that may be preceded by one or more modifier codes. For example, the complete address may be a destination address of the SIP element 132.

The matching rules of the dialing plan also may identify certain pattern elements indicating that the received pattern elements correspond to a complete address even though the received pattern elements do not match a format of a complete address specified in the dialing plan. Additionally, the matching rules may include commands for interacting with the User Interface 114 before some or all pattern elements are received from the User Interface 114. The SIP User Agent 112 may identify that the received pattern elements correspond to the complete address, but may or may not be capable of locally determining the meaning of the complete address. For example, the SIP server 122 may interpret the complete address for establishing a data session, which may include routing of the data session, providing a service during the data session, etc. The SIP User Agent 112 may interpret received pattern elements to locally provide some local processing at the SIP Device 110, such as determining whether the address corresponds to the structure and format of a complete address, but may not process the complete address for routing the data session or other functionality provided by the SIP Server 122, for example. It is noted that the above division of functions between the SIP Server 122 and the SIP User Agent 112 is exemplary, and the division may be modified to where the SIP Server 122 performs some or all of the functions of the SIP User Agent 112, or the SIP User Agent 112 may perform some or all of the functions of the SIP Server 122. Other devices also may be used. Specifics of the dialing plan are described later in detail. After the analysis module 408 receives the dialing plan, the SIP Device 110 may analyze pattern elements received from the User Interface 114.

During establishment of a data session, the receiver module 404 of the SIP User Agent 112 may receive analog information from the User Interface 114. The analog information may include the initialization signal, analog signals representing one or more pattern elements, analog signals for communicating across a telephone and/or data network, and/or combinations thereof. The receiver module 404 may convert the analog signals representing the one or more pattern elements into digital representations of the pattern elements for storage in the buffer 420. The digital representations of the pattern elements are herefoth referred to as "pattern elements."Once one or more pattern elements are received, the receiver module 404 may instruct the buffer module 410 to store the received pattern elements in the buffer 420 for temporary storage before transmission to the IP Network 120.

The initialization module 406 may monitor the analog information received by the receiver module 404 for the initialization signal. In an exemplary embodiment, the initialization signal may indicate when the User Interface 114 is attempting to initiate a data session. For example, the initialization signal may be an "off-hook" signal indicating that a user has lifted a telephone receiver, a facsimile machine is ready to transmit a fax, a data modem is preparing to make a data communications connection, etc.

Once the initialization module 406 identifies the initialization signal, the initialization module 406 may perform several functions. For example, the initialization module 406 may instruct the tone module 412 to generate a tone for the User Interface 114. The tone may be music, or other sounds (e.g., traditional dial tone) at a single or varying frequencies that may be audible at the User Interface 114, for example. Also, the tone module 412 may generate a visual message for display at the User Interface 114. The tone module 412 may remove the initial dial tone upon reception of the first pattern element. Other dial tones may be applied as specified by the dialing plan. It is noted that the initial dial tone generated by the SIP User Agent 112 may not be specified by the dialing plan, and may be influenced by such conditions as the state of the User Interface 114. For example, whether the SIP Device 110 applies a message waiting indicator if a previous data session has been established when a second connection request is received.

In addition, the initialization module 406 may instruct the timer module 414 to start a time interval (e.g., 16 seconds). Further, the initialization module 406 may instruct the buffer module 410 to empty the buffer 420 of any pattern elements stored therein. Additionally, the initialization module 406 may instruct the analysis module 408 to begin to analyze pattern elements stored in the buffer 420 based on the dialing plan as the pattern elements are received to determine whether the received pattern elements correspond to a complete address. The initialization module 406 may provide other functions as well.

In an exemplary embodiment, the analysis module 408 may monitor one or more pattern elements in the buffer 420 to determine whether the one or more received pattern elements correspond to a complete address specified in the dialing plan. For example, the analysis module 408 may use the dialing plan to determine whether the received pattern elements correspond to a format of a complete address (e.g., satisfy one or more matching rules in the dialing plan), whether the received pattern elements include an end-of-dialing pattern element, and/or whether a time interval expires after receiving one or more pattern elements. These determinations may permit the analysis module 408 to identify when the User Interface 114 has completed dialing and whether the received pattern elements correspond to a complete address.

The analysis module 408 may monitor the one or more received pattern elements after the initialization signal until one of the following occurs: (1) a first time interval expires without receiving any pattern elements (e.g., 16 seconds); (2) a second time interval expires after receiving at least one pattern element; (3) an end-of-dialing pattern element is received even if the received pattern elements may not correspond to a format of a complete address; and (4) the received pattern elements match a format of a complete address specified by the dialing plan, with minimal possibility that additional pattern elements may match a longer sequence of pattern elements. Condition (1) may result in the analysis module 408 determining an error; conditions (2) and (3) may indicate that the analysis module 408 may presume that the received one or more pattern elements may be a complete address, which may be a correct address, or an erroneous address entered by a user of the User Interface 114 or erroneously generated by an improperly programmed or malfunctioning User Interface 114, etc.; and condition (4) may indicate that the received pattern elements correspond to a complete address.

If the received pattern elements do not correspond to a complete address, the analysis module 408 may perform analysis to identify whether the received pattern elements partially satisfy a matching rule. A complete match may be unambiguous as to which matching rule (or which part of the matching rule) the received pattern elements satisfy and may not involve analysis of partial matches. Partial matches may occur where the analysis module 408 determines that the received pattern elements may satisfy one or more matching rules (or parts of one matching rule) of the dialing plan, and that the receiving module 404 may have not yet received all pattern elements from the User Interface 114. The analysis module 408 may identify, based on the received pattern elements, every partial match of any matching rule, which may be used in subsequent processing. For example, after identification of partial matches, the analysis module 408 may keep track of previously identified partial matches and analyze a newly received pattern element to prevent redundant analysis of the previously received matching elements stored in the buffer 420. Also, the analysis module 408 may identify, within the received pattern elements, the preceding partial match.

The identification of partial matches may include situations where the received pattern elements may satisfy more than one matching rule. If the analysis module 408 identifies a partial match that may satisfy two or more alternative matching rules (or two or more parts within one matching rule), the analysis module 408 may arbitrarily or may be programmed to choose one of the two alternatives. For the chosen alternative, the analysis module 408 may analyze the received pattern elements based on the chosen alternative and may ignore the other alternatives.

If the analysis module 408 determines that the received pattern elements correspond to a complete address, the analysis module 408 may then instruct the request module 416 to generate a connection request based on the received pattern elements stored in the buffer 420. In an exemplary embodiment, the request module 416 may receive an instruction from the analysis module 408 that the one or more received pattern elements stored in the buffer 420 correspond to a complete address and may generate a connection request based on the received pattern elements. For example, the request module 416 may generate a SIP INVITE message that includes the received pattern elements. The request module 416 may forward the connection request to the SIP Server 122 over the IP Network 120 to request establishment of a data session between the SIP User Agent 112 and a device identified in the complete address. For example, the complete address may be a destination address of the SIP Element 132, for example. Once the data session is established, the SIP User Agent 112 may communicate with the SIP Element 132, for example. Below describes various exemplary dialing plans useable by the SIP User Agent 112 for analyzing received pattern elements.

In an exemplary embodiment, the dialing plan may include one or more matching rules for determining whether the received patterns elements correspond to a complete address and may include zero or more commands. The matching rules of the dialing plan may determine whether received pattern elements match a format of a destination address code and/or zero or more modifier codes. The dialing plan also may include ordering information identifying an order for applying the matching rules. For example, the ordering information may specify that matching rules for modifier codes are applied before matching rules for a destination code. Each of the destination address code, the modifier codes, the ordering information, and commands are described below in further detail.

A destination address code may include information representing an address of a device communicatively coupled to a data network, a telephony network, and/or other networks. For example, the destination address code may represent a destination address of the SIP Element 130. The SIP Server 122 may use the destination address code to set up a data session between the SIP Device 110 and the device specified by the destination address code (e.g., SIP Element 130). In various exemplary embodiments, the destination address code may be a public number (e.g., a national or international E.164 address), a private number (e.g., a Centrex extension number), an abbreviated number that translates to a public or private number (e.g., a speed dial number), a data network address (e.g., a IP address), other suitable device addresses for data and/or telephony networks as are well known, and/or combinations thereof.

A destination address code that is, or is translated to, a public or private number may be preceded or followed by several modifier codes that modify the data session in some way. In an exemplary embodiment, the modifier codes may be information to specify services requested by the User Interface 114 for the data session, to modify the operation of some feature for a single data session, to control routing of a data session over the data network or over a telephony network, to select a particular carrier for routing the data session, and/or combinations thereof. In an exemplary embodiment, the modifier codes may be one or more of a feature access code, a facility access code, a carrier access code, and/or combinations thereof.

The feature access code may be a code for requesting certain services be available during the data session. For example, in North America, a feature access code may include a Vertical Service Code (VSC). The VSC may have the format of *XX or *XXX (or, equivalently, 11XX or 11XXX), where 'X' represents digits 0-9. In private dialing plans, for example, feature access codes may use *X(XX) formats, and/or may use other formats, for example. Before a data session is established, a user of the User Interface 114 may input analog information specifying a particular feature access code for the data session. For example, the user may dial keys on a telephone that produce DTMF signals of a desired feature access code. The features access code (e.g. a VSC) may request various services during the data session, such as call waiting, voice activated dialing, call hold, call blocking, caller identification, translating a public or private number (e.g., call return to call the last phone that called you), connecting to an existing call (e.g., call pickup), managing features provided by the SIP Server 122 (e.g., activate or deactivate call forwarding), etc., other known calling features as are well known, which are omitted for brevity, and/or combinations thereof. Also, the feature access code may be used to specify various data session features in accordance with local, international, public, and/or private telecommunications providers that may differ from VSC.

A facility access code may specify routing of the data session over the data network. In an exemplary embodiment, the facility access code may select a particular "tie line" or "trunk group" over which the data session may be routed, and may have the format of '#XX'.

A carrier access code may select a particular local, inter-exchange, or international carrier to route the data session. For example, the carrier access code may specify that the data session is routed over an exchange operated by a particular telecommunications provider.

In addition to the destination address code and the modifier codes, the dialing plan also may specify various situations that, when the received pattern elements satisfy the matching rule, instruct the SIP User Agent 112 to perform various commands. The commands may be instructions useable by the SIP User Agent 112 to perform certain operations after matching a particular sequence or subsequence in the received pattern elements. Also, the SIP User Agent 112 may perform the various operations before or after receiving all of the pattern elements. In an exemplary embodiment, the commands may include a timer T, a dial tone P, a recall dial tone R, an insertion modifier I, an emergency modifier E, a service code S, and/or combinations thereof, each of which is discussed below in further detail.

The symbol T occurring in a matching rule of the dialing plan may represent a timer identifying a time interval, which may be generated by the timer module 414. The analysis module 408 may determine a match if the received pattern elements matches a sequence of pattern elements specified by the matching rule followed by the T command (e.g., (XXX)T) and the timer module 414 indicates that a time interval expires before receiving an additional pattern element. For example, if the matching rule includes 17T, the analysis module 408 may determine a match if the time interval expires after receiving a pattern element sequence that includes a 1 pattern element followed by a 7 pattern element. Also, the matching rule may specify that if at any given point the analysis module 408 determines that the received pattern elements partially match two or more alternative sequences in a matching rule (or within two or more matching rules), at least one of which specifies the timer, the analysis module 408 may determine a match with the alternative including the timer if the time interval expires prior to receiving an additional pattern element. This matching rule may be modified based on design constraints. Also, the SIP User Agent 112 may eliminate an arbitrary subset of the partially matching pattern alternatives in order to eliminate the conflict. This may eliminate conflicts in matching rules including a timer, a tone, character insertion, subsequence identification commands, and/or combinations thereof.

The symbol P occurring in a matching rule of the dialing plan may represent an instruction to generate a dial tone when a sequence of received pattern elements matches a sequence in the dialing plan followed by the P command (e.g., (XX)P). For example, if the matching rule includes the sequence 1P, the analysis module 408 may determine a match if the received pattern element sequence includes a 1 pattern element. After the match, the analysis module 408 may instruct the tone module 412 to generate a tone. For example, a matching rule including the symbol P may cue the user of the User Interface 114 to input additional DTMF signals after hearing the dial tone. Also, generation of the tone may be subject to the following matching rule that if at any given point the analysis module 408 determines that the received pattern elements partially match two or more alternatives within a matching rule (or within two or more matching rules), not all of which specify the activation of a given dial tone, the analysis module 408 may not instruct the tone module 412 to generate the tone. This matching rule may be modified based on design constraints.

The symbol R occurring in a matching rule of the dialing plan may represent an instruction to generate a recall dial tone when a sequence of received pattern elements matches a sequence in the dialing plan followed by the R command (e.g., (XX)R). For example, if the matching rule includes the sequence 7R, the analysis module 408 may determine a match if the received pattern element sequence includes a 7 pattern element. After the match, the analysis module 408 may instruct the tone module 412 to generate a signal for producing a recall dial tone at the User Interface 114.

The symbol I occurring in a matching rule of the dialing plan may represent an instruction to insert a pattern element into the received pattern elements immediately after the sequence of one or more received pattern elements that matches a sequence specified by the dialing plan followed by the I command and the pattern element to be inserted (e.g., (XX)I#). For example, if the matching rule includes (62)I#, the analysis module 408 may determine a match if the received pattern element sequence includes a 6 pattern element followed by a 2 pattern element (e.g., 62). Thereafter, the analysis module 408 may insert the # pattern element in the buffer 420 immediately following the 2 pattern element (e.g., 62#).

Insertion of a pattern element may occur after the analysis module 408 identifies that the received pattern elements correspond to a complete address, identifies the received pattern elements include the end-of-dialing pattern element, or a time interval expires after receiving one or more pattern elements. Waiting until any of the above situations occurs may eliminate ambiguity as to which pattern elements are evaluated based on the matching rule for the insertion. If the analysis module 408 determines that the received pattern elements satisfy two or more alternatives within a matching rule (or within two or more matching rules), one of which includes insertion of a pattern element, the analysis module 408 may arbitrarily or may be programmed to choose one of the alternatives for insertion or subsequence matching. For the chosen alternative, the analysis module 408 may apply pattern element insertion if specified by the chosen alternative. If collection of pattern elements ends for any reason other than a complete pattern match, the analysis module 408 may perform any specified character insertion or subsequence matching that is included in a complete match or partial match.

In an exemplary embodiment, the insert command I may insert a delimiting pattern element immediately after a particular sequence of pattern elements to reduce the amount of processing of the connection request performed by the SIP Server 122. For example, recognition of a subsequence of pattern elements within a sequence of received pattern elements without the use of delimiters may cause the SIP Server 122 to make more than one matching pass over the connection request. To avoid redundant matching, the analysis module 408 may use the insert command I to insert a delimiter into the received pattern elements to separate selected codes (e.g., modifier codes and/or destination address codes) in the connection request before forwarding the connection request to the SIP Server 122. The SIP Server 122 may quickly process the connection request based on identifying the delimiting pattern elements between the various codes. For example, the SIP Server 122 may specify that particular sequences within the received pattern elements included in the connection request may be delimited by a specific pattern element, such as, but not limited to, the # pattern element. The SIP Server 122 also may specify in the dialing pattern that VSCs, modifier codes, destination address codes, etc., be delimited. Other portions of the received pattern elements also may be delimited. If not specified in the dialing plan, the SIP User Agent 112 may not delimit modifier and/or destination address codes.

The symbol E occurring in a matching rule of the dialing plan may represent an emergency call. If the analysis module 408 identifies that one or more of the received pattern elements match a sequence included in a matching rule followed by the E command (e.g., (XXX)E), the analysis module 408 may determine that the received pattern elements represent an emergency call. For example, if the matching rule includes the sequence (911)E, the analysis module 408 may determine a match if the received pattern element sequence includes a 9 pattern element followed by a 1 pattern element, followed by a 1 pattern element, for example. Other sequences of pattern elements may be recognized as emergency calls, such as, but not limited to, 911, 1911, 0911, and 101XXXX911. A private dialing plan and other localities may have different emergency number patterns, which may be designated in the dialing plan by the E command.

After determining that the received pattern elements represent an emergency call, the analysis module 408 may perform subsequent processing on the received pattern elements before generating a connection request. In an exemplary embodiment, when the analysis module 408 determines that the received pattern elements match the pattern for an emergency call, the analysis module 408 may instruct the request module 416 to send connection request that includes a Priority header with the value "emergency" and may also include a Resource-Priority header with a value indicating an emergency, such as, but not limited to, "emrg.0," for example The SIP User Agent 112 also may receive a connection request with a Priority header whose value is "emergency" and a Resource-Priority header whose value is "emrg.0." A data session initiated by a connection request with an "emergency" Resource-Priority header value of "emrg.0," in either direction, may be considered an emergency data session.

The symbol S occurring in a matching rule of the dialing plan may represent a service code of local interest to the SIP User Agent 112. If the analysis module 408 identifies that the one or more pattern elements match a sequence specified by the dialing plan followed by the S modifier (e.g., (XXX)S), the analysis module 408 may determine that the received pattern elements represent a service code that may be of local interest to the SIP User Agent 112. For example, a service code may be a feature access code (e.g., VSC) such as "70," which may be processed locally by the analysis module 408. The analysis module 408 may then instruct the SIP User Agent 112 to cancel call waiting during the data session to be initiated.

The dialing plan also may include ordering information for specifying an order for applying matching rules. For example, the ordering information may specify that the received pattern elements are first analyzed based on a matching rule for identifying modifier codes, and are then analyzed based on a matching rule for identifying a destination address code. The ordering information may specify applying the matching rules in other orders as well, depending on the local and/or international telecommunications providers.

The dialing plan may include an end-of-dialing pattern element permitting the user to explicitly identify when the User Interface 114 has finished dialing. For example, the # pattern element may be used by the User Interface 114 as a "send" key or an "enter" key to identify that the User Interface 114 has finished dialing. Other pattern elements or additional pattern elements may be used as the end-of-dialing pattern element. In an exemplary embodiment, when a code (e.g., modifier code, destination address code, etc.) is followed by an end-of-dialing pattern element, a time interval may be monitored (e.g., 4 seconds in duration). After expiration of the time interval without receiving additional pattern elements, the analysis module 408 may assume end of dialing by the User Interface 114 and that the received pattern elements stored in the buffer 420 correspond to a complete address. Thus, the dialing plan may be useable by the SIP User Agent 112 to efficiently process pattern elements received from the User Interface 114.

It is noted that the above examples of the dialing plan are exemplary. The dialing plan may specify different combinations of the various codes, omit one or more of the various codes, and/or specify different orders for the various codes for identifying permissible complete addresses within the scope of the invention. The dialing plan also may specify different combinations of the various commands, omit one or more of the various commands, and/or specify different orders for the various commands.

The following provides various specific examples of public and private dialing plans.

In an exemplary embodiment, a public dialing plan may include the following matching rules and pattern elements (the use of N and X may follow the convention that X represents any of the digits 0-9 and N represents any of the digits 2-9). For a match with format of a complete address, the public dialing plan may include a matching rule specifying that a complete address may include:

(1) zero or more repetitions of a feature access code (e.g., *XX or 11XX for a small set of XXs, such as 67, 70, and 82) that modify a call, followed by:

(2) zero or one carrier access codes (e.g., 101XXXX), followed by:

(3) zero or more feature access codes that do not modify a call (e.g., *XX, *XXX, 11XX, or 11XXX, for XXs other than the small set of features access codes above in (1) that modify a call), followed by:

(4) a destination code that conforms to one of the following formats, for example, the format of the destination address code may be: a 0 pattern element optionally followed by a # pattern element; a pattern element sequence of 00; a pattern element sequence of 011 followed by a sequence of up to 15 additional pattern elements, optionally followed by a # pattern element; a pattern element sequence 01 followed by a sequence of up to 15 additional pattern elements (the first of which may be 2-9), optionally followed by a # pattern element; a 0 pattern element followed by a pattern element sequence of N11; a 0 pattern element followed by a pattern element sequence of NXX NXX XXXX or NXX XXXX; a 1 pattern element followed by a pattern element sequence of NXX NXX XXXX or NXX XXXX; a pattern element sequence of N11; a pattern element sequence of NXX NXX XXXX or NXX XXXX; a N pattern element optionally followed by a # pattern element; or a pattern element sequence of NX, optionally followed by a # pattern element.

The public dialing plan also may include ordering information specifying that the analysis module 408 may analyze the received pattern elements order described above.

In many of the modifier and destination address codes of the public dialing plan example discussed above, the first few pattern elements may uniquely determine how many, if any, pattern elements are expected to follow. The end-of-dialing pattern element or a time interval may be used when it is not clear when the user has completed dialing, for example. In many dialing plans, the time interval or the end-of-dialing pattern element may be implemented for speed dialing and international numbers.

In the public dialing plan discussed above, there are instances where sequences of both 7- and 10-pattern elements may be allowed, which may cause ambiguity. Because most combinations of pattern element sequences (e.g., NXX) are valid for use both as the numbering plan area (NPA) (e.g., an area code, which are the first three digits in a 10-digit sequence) in a 10-digit sequence of pattern elements and an office code (e.g., the first three digits in a 7-digit sequence) in a 7-digit sequence of pattern elements, a matching rule of the dialing plan may remove this ambiguity without involving expiration of a time interval or use of an end-of-dialing pattern element.

In an exemplary embodiment, where both 7- and 10-digit sequences of pattern elements may be permitted for local calls, the dialing plan may use a list of NPA codes to distinguish between 7-digit sequences of pattern elements and 10-digit sequences of pattern elements. For local calls, dialing 10 digits may imply that the call is to an NPA adjacent to the caller's NPA. Here, the term adjacent may mean either geographically contiguous or overlaid onto the same geographic area. For any NPA, a few adjacent NPAs may be considered local to any given subscriber, and within an NPA, the NPA numbers of adjacent NPAs are unavailable for use as office codes in a 7-digit local call. Hence, to remove ambiguity between 7-digit and 10-digit sequences of pattern elements, the dialing plan may include a matching rule based on a list of the adjacent NPAs that may dialed as 10-digit local calls. The matching rule may identify a 10-digit sequence of pattern elements if the first three received pattern elements match an adjacent NPA, and may identify a 7-digit sequence of pattern elements if the first three received pattern elements do not match an adjacent NPA. For long distance calls, 0+ or 1+ dialing may be used along with 10-digit sequences of pattern elements to avoid ambiguity with local calls. Thus, the analysis module 408 may determine whether a 7-digit or 10-digit sequence of pattern elements is expected based on the list of adjacent NPAs.

The above Public Dialing plan is exemplary, and various modifications to the codes, including their lengths, may be made to comply with the telecommunications provider.

A private dialing plan may found in a business group, a university, etc., (e.g., a Centrex group), and may differ from the public dialing plan in one or more of the following ways, the private dialing plan may: (1) permit abbreviated dialing, in the form of "extension numbers" of one to five digits, to allow one member of the group to call another member of the same group; (2) include feature access codes appearing in multiple formats, including a * pattern element or a # pattern element followed by one to four digits, followed by all-numeric codes of one to five digits; (3) include one or more access codes followed by numbers (including carrier access codes) in the public dialing plan, as discussed above.

Below is an exemplary private dialing plan. The private dialing plan may include a matching rule specifying that a complete address may include:

(1) zero or more feature access codes in a first format (e.g., #X), followed by:

(2) zero or more feature access codes in a second format (e.g., *XX), followed by:

(3) zero or more feature access codes in a third format (e.g., 7XX), followed by:

(4) one of the following destination address codes: a four digit pattern element sequence representing an extension (e.g., 1XXX or 2XXX); a five digit pattern element sequence representing an extension (e.g., 3XXXX or 4XXXX); a facility access code (e.g., 5XX), a tie line access code or immediate cut-through to tie line access code (e.g., 6); a private network access code followed by a number sequence (e.g., 8 NXX XXXX); or a number followed by a public network number (e.g., 9 NXX XXXX or 9 0 NXX NXX XXXX) with or without a carrier access code, 0−, 0+, or 1+.

The above Private Dialing plan is exemplary, and various modifications to the matching rules and codes, including their lengths and order, may be modified to comply with a telecommunications provider and/or the private entity.

Below is a description of a syntax of an exemplary pattern language used to define matching rules or portions of matching rules in a dialing plan. The pattern language may be analogous to a computer programming language that may be used by the analysis module 408 for analyzing received pattern elements for matches.

A matching rule may be a sequence of one or pattern elements and/or operators against which received pattern elements may be compared to identify a match. A match may occur when the received pattern elements are the same as a sequence contained within the matching rule and the received pattern elements satisfy all of the operators contained within the matching rule.

A pattern alternation within a matching rule may include sequences of one or more pattern elements separated one by a vertical bar "or" operator (e.g., "|"). A matching rule having a pattern alternation may match a sequence of pattern elements that includes any one of the sequences separated by the vertical bar (e.g., X|XXX|XX). For example, if the matching rule includes (12|71|35), the analysis module 408 may identify a match if the received pattern elements contains one of: (1) the pattern element sequence 12; (2) the pattern element sequence 71; or (3) the pattern element sequence 35. In an exemplary embodiment, the "or" operator may be used for equivalent pattern elements, such as, but not limited to, the * pattern element and its alternative equivalent pattern element sequence of 11.

A sequence of pattern elements included in a matching rule without an explicit operator may indicate a match if the received patterns elements matches all of the pattern elements in the sequence (e.g., XXX). For example, a matching rule including the sequence 145 may indicate a match if the received pattern elements include the sequence 145.

A matching rule including the character "X" may signify a match when the received string of pattern elements contains any one of pattern elements zero through nine (e.g., X). For example, if the matching rule includes X, the analysis module 408 may identify a match if the received pattern elements contains any numerical pattern element from zero through nine, inclusive. For example, the matching rule may indicate a match for 1, 2, 3, 4, etc.

A repeated pattern operator in a matching rule is a sequence of one or more pattern elements associated with one of the following: (1) one or more digits, optionally followed by a comma, which may further be optionally followed by one or more digits, all enclosed in curly braces (e.g., X{m}, X{m,}, and X{m, n}, where m=0, 1, 2, . . . ; n=0, 1, 2, 3, . . . ; and n≥m); (2) a dot (e.g., "X.") specifying a minimum of zero and a maximum of infinity repetitions of the sequence; (3) a question mark (e.g., "X?") specifying a minimum of zero and a maximum of one repetition of the sequence; and (4) a plus sign (e.g., "X+") specifying a minimum of one and a maximum of infinity repetitions. For X{m} above, the digit 'm' may specify the number of repetitions of the X pattern element. For X{m,}, the digit 'm' may specify the minimum number of repetitions of the X pattern element and the maximum number of repetitions may be infinity. For X{m, n}, 'm' may specify the minimum number of repetitions of X and 'n' may specify the maximum number of repetitions. A matching rule including the repeated pattern operator may match received pattern elements that match a minimum to maximum number (if applicable) of repetitions of the sequence of one or more pattern elements before the repeated pattern operator.

For example, if the matching rule includes '3.', the analysis module 408 may identify a match if the received pattern elements contain zero or more occurrences of a 3 pattern element. If the matching rule includes '4?,' the analysis module 408 may identify a match if the received pattern elements contain zero or one occurrences of a 4 pattern element. If the matching rule includes '5+,' the analysis module 408 may identify a match if the received pattern elements contain one or more occurrences of a 5 pattern element. If the matching rule includes 5{3}, the analysis module 408 may identify a match if the received pattern elements contains the pattern element sequence 555. If the matching rule includes 2{3, 5}, the analysis module 408 may identify a match if the received pattern elements contain three consecutive occurrences, four consecutive occurrences, or five consecutive occurrences of a 2 pattern element (e.g., pattern element sequence of 222, 2222, or 22222). If the matching rule includes 4{3,}, the analysis module 408 may identify a match if the string of pattern elements contains three or more consecutive occurrences of a 4 pattern element.

A matching rule including a sequence of one or more pattern elements followed by a sequence of one or more modifiers may match a sequence of received pattern elements that matches the sequence of one or more pattern elements preceding the modifier (e.g. XXX T, XXX R S T). Modifiers may be associated with the symbols T, P, R, I, E, S, as discussed above.

A simple pattern operator may be one or more sequences of one or more pattern elements and/or other operators separating the sequences enclosed in parentheses (e.g., ([XX]|XX|XX)). A matching rule including the simple pattern operator may match any of the sequences of one or more pattern elements resulting from applying the operators within the enclosed parenthesis. For example, if the matching rule includes (5|81), the analysis module 408 may identify a match if the string of pattern elements contains a 5 pattern element, followed by an 8 pattern element, followed by a 1 pattern element. If the matching rule includes (5|8), the analysis module 408 may identify a match if the string of pattern elements contains a 5 pattern element or a 1 pattern element.

Simple pattern operators also may be recursive. For example, if the matching rule includes a pattern alternation within parenthesis, the pattern language may be recursive. In analyzing received pattern elements, the analysis module 408 may recursively analyze the received pattern elements based on the multiple different possible sequences of pattern elements due to the pattern alternation within the matching rule.

A digit class operator may enclose a sequence of one or more pattern elements in brackets (e.g., [XX]) in a matching rule and may determine a match when identifying the occurrence of any one of those pattern elements. Also, the digit class operator may include the caret symbol appearing immediately following the opening bracket (e.g., [^XX]), which may represent a match when identifying the occurrence of any pattern elements other than the enclosed pattern elements. For example, if the matching rule includes the sequence [12], the analysis module 408 may identify a match if the received pattern elements contains a 1 pattern element or a 2 pattern element. If the matching rule includes the sequence [^12], the analysis module 408 may identify a match if the received pattern elements do not contain a 1 pattern element or a 2 pattern element. Within the brackets, the notation "m–n" may represent a digit range of all digits from m through n, inclusive, where m is less than n, and m=0, 1, 2, 3, . . . ; n=1, 2, 3, . . . ; and n>m (e.g., [m–n]). The analysis module 408 may identify a match if the received pattern elements include any of the digits from the first digit (e.g., 'm') through the second digit (e.g., 'n'), inclusive. For example, if the matching rule includes the digit range 2-4, the analysis module 408 may identify a match if the received pattern elements contain a 2 pattern element, a 3 pattern element, or a 4 pattern element.

A dialed-digit included in a matching rule may match any of X|A|B|C|D|*|# in the received pattern elements, where X=0, 1, 2, . . . 9. For all alphabetic symbols, case may not be significant. The pound sign (e.g. '#') also may be referred to as an octothorpe, a hash mark, a sharp, or a number sign.

Several commands may appear in a matching rule nested to arbitrary depth (e.g., ((XX|XX+)P)R). In an exemplary embodiment, any such sequence of commands may be subject to the following restrictions: no modifier command may appear more than once in a matching rule; the E and S commands are mutually exclusive; and the P and R commands are mutually exclusive. In an exemplary embodiment, the commands may appear in the following order in a matching rule: E or S, I, P or R, and T. Other orders and/or restrictions also may be applied.

Additionally, the dialing plan may specify additional rules based on partial matches when analyzing the received pattern elements. A partial match may indicate that the contents of the buffer 420 match part of a sequence for one or more matching rules such that it may be possible that additional pattern elements may be received to form a match for a longer sequence. When a longer match is available, the analysis module 408 may indicate that the shorter match fails and the analysis module 408 may wait to receive additional pattern elements. The longest-match rule may simplify distinguishing between 7- and 10-digit sequences of pattern elements, which may be used for dialing a telephone number, for example. If the contents of the buffer 420 match at least one sequence of pattern elements in a matching rule that can match at least one more digit of a longer matching rule, the analysis module 408 may not identify a match and may continue processing received pattern elements in an attempt to satisfy a matching rule having a longer sequence of pattern elements.

In an exemplary embodiment, if the dialing plan permits both 10-digit and 7-digit sequences of pattern elements, and if the received sequence may match the 7-digit sequence and may potentially match the 10-digit sequence, the longest possible match rule may specify that the 7-digit alternative fails. For example, if the dialing plan specifies ((508|887)[2-9] X{6}|[2-9]X{6}), and the received 7-digit sequence of pattern elements is 5085551, even though the dialing plan may indicate a match for the 7-digit sequence is possible, the analysis module 408 may not identify a 7-digit match since a longer match with the 10-digit rule may be possible. This also may be reversed if specified otherwise in the dialing plan.

Below are several exemplary dialing patterns and associated matching rules. In these examples, spaces and line breaks are included between pattern elements, commands, etc., in the matching rules to improve readability. The formal specification of the dialing pattern may permit similar use of spaces. Spaces also may be interpreted as part of the dialing pattern or may be omitted.

EXAMPLE 1

A dialing pattern for a public dialing plan with uniform 10-digit dialing (7-digit dialing is not permitted) may include the following three lines of a matching rule:
1. ((*|11) (67|70|82)) S R I# {0,3}
2. (101XXXX)?
3. ((*|11) ([23]XX|[01459]X|6[^7]/7[^0]|8[^2])) S I#|(0T|00|011?[2-9]X{0,14}T|[01]? ([2-8]|11|911E|[2-9]([^1]X|1[^1]) X{7})|[2-9][^1]?T)

It is noted that the matching rule is broken into three lines to improve readability of the matching rule. Also, lines 1-3 may each represent a matching rule, if desired. The same may apply for the other exemplary matching rules discussed below.

Thus, the analysis module 408 may analyze the one or more pattern elements for zero to three first feature access codes (see line 1), followed by zero or one carrier access codes (see line 2), followed by one of a second feature access code, a zero, two zeroes, 01 or 011 followed by up to 15 digits, N11 or a 10-digit number optionally preceded by a zero or a one, or one or two digits (see line 3). Referring to line 1, if the received pattern elements include the sequence *82, the analysis module 408 may identify a match, may instruct the tone module 220 to generate the recall dial tone, may indicate that the sequence *82 represents a service code, and may insert the # pattern element (e.g., *82#), for example. Referring to line 2, if the received pattern elements include the sequence 1014545, the analysis module 408 may identify a match, for example. Referring to line 3, if the received pattern elements include the sequence 11255, the analysis module 408 may identify a match, may indicate that the sequence 11255 represents a service code, and may insert one # pattern element (e.g., 11255#), for example. Again referring to line 3, if the received pattern elements include the sequence 1911, the analysis module 408 may identify a match, and may indicate that the sequence 1911 represents an emergency call, for example.

EXAMPLE 2

A dialing pattern for a public dialing plan with 7-digit dialing for local calls and 1+ dialing for other calls. In this example, 10-digit dialing may not permitted without a leading 1, and an operator-assisted local call may be dialed as 0+10 digits. The dialing plan in example 2 includes a matching rule having the following three lines.
1. ((*|11) (67|70|82)) S R I# {0,3}
2. (101XXXX)?
3. ((*|11) ([23]XX|[01459]X|6[^7]|7[^0]|8[^2])) S I#| (0T|00|011?[2-9]X{0,14}T|[01] ([2-8]|1|911E|[2-9] ([^1]X|1[^1])X{7})|[2-8] 1|911E|[2-9] ([^1]X|1[^1]) X{4}|[2-9] [^1]?T)

Thus, the analysis module 408 may analyze the one or more pattern elements for zero to three first feature access codes (see line 1); zero or one carrier access codes (see line 2); zero or one second feature access codes (see line 3); and a 7-digit call, a 1+10-digit call, or zero or one an emergency calls (see line 3), for example.

EXAMPLE 3

A dialing pattern for a public dialing plan with mixed 7- and 10-digit dialing, with six NPAs permitted for 10-digit dialing, and other NPAs dialed as 1+ or 0+. The dialing plan in example 3 includes a matching rule having the following three lines.
1. ((*|11) (67|70|82)) S R I# {0,3}
2. (101XXXX)?
3. ((*|11) ([23]XX|[01459]X|6[^7]|7[^0]|8[^2])) S I#| (0T|00|011? [2-9]X{0,14}T|[01] ([2-8] 1|911E|[2-9] ([^1]X|1[^1]) X{7})|508|887|978|351|781|339) [2-9] X{6}|[2-8]|1|911E|[2-9] ([^1]X|1[^1]) X{4}|[2-9] [^1]?T)

Thus, the analysis module 408 may analyze the one or more pattern elements for zero to three first feature access codes (see line 1); zero or one carrier access codes (see line 2); zero or one second feature access codes (see line 3); and a 10-digit call in NPAs 508, 887, 978, 351, 781, or 339, 0+ or 1+ for other 10-digit calls, 7-digit calls, or zero or one an emergency calls (see line 3).

Note in example 3 that the dialing plan may distinguish between 7- and 10-digit pattern element sequences based on a list of NPAs for which 10-digit pattern element sequences may be permitted. For areas allowing both 7- and 10-digit pattern element sequences, there typically may be a few NPAs permissible for use in 10-digit pattern element sequences, with most other NPAs being preceded by 1+, for example. As more NPAs are allowed for 10-digit pattern element sequences, the probability may increase that a 10-digit pattern element sequence including the NPA may also be a valid office code for 7-digit dialing, which may render 7/10 digit dialing ambiguous. For these situations, the dialing plan may use expiration of a time interval or may have an end-of-dialing pattern element to signal completion of 7-digit dialing.

EXAMPLE 4

A dialing pattern for a private dialing plan may include a matching rules with the following two lines:
1. (((*|11) (67|70|82)) S R|(*|11)41RXXXXXX) I# {0,4}
2. ((#X|((*|11) ([01239]X|4[^1]|5[^12]|6[^7]|8[^2])) S|(*|11) (51RXXXX|52XXXX)) I#|[12]XXX|[34]XXXX|5XX|6|7XX|8X{7}|9P (101XXXX)? (0|00|011?[2-9]X{0,14}|[01][2-9]X{9}|[2-9]X{9}))

Thus, the analysis module 408 may analyze the one or more pattern elements for zero to four feature access codes (see line 1); and for various extensions, carrier access codes, etc. (see line 2).

In example 4, there are a few items to note. First, an account code prefix, *41+recall dial tone+six-digit account code+recall dial tone, may optionally be dialed prior to dialing any call (see line 1). Second, as in the public dialing plans, *70, *67, and *82 can be dialed prior to dialing any call (see line 1). Third, call park may be dialed as *51+recall dial tone+four-digit extension code (see line 2). Fourth, directed call pickup may be dialed as *52+four-digit extension code (see matching rule 2). Fifth, a second dial tone may be provided after the 9 is dialed to access the public dialing plan (see line 2). Finally, public numbers may be dialed as 10 digits, whether local, 1+, or 0+ (see line 2).

Figure 5:
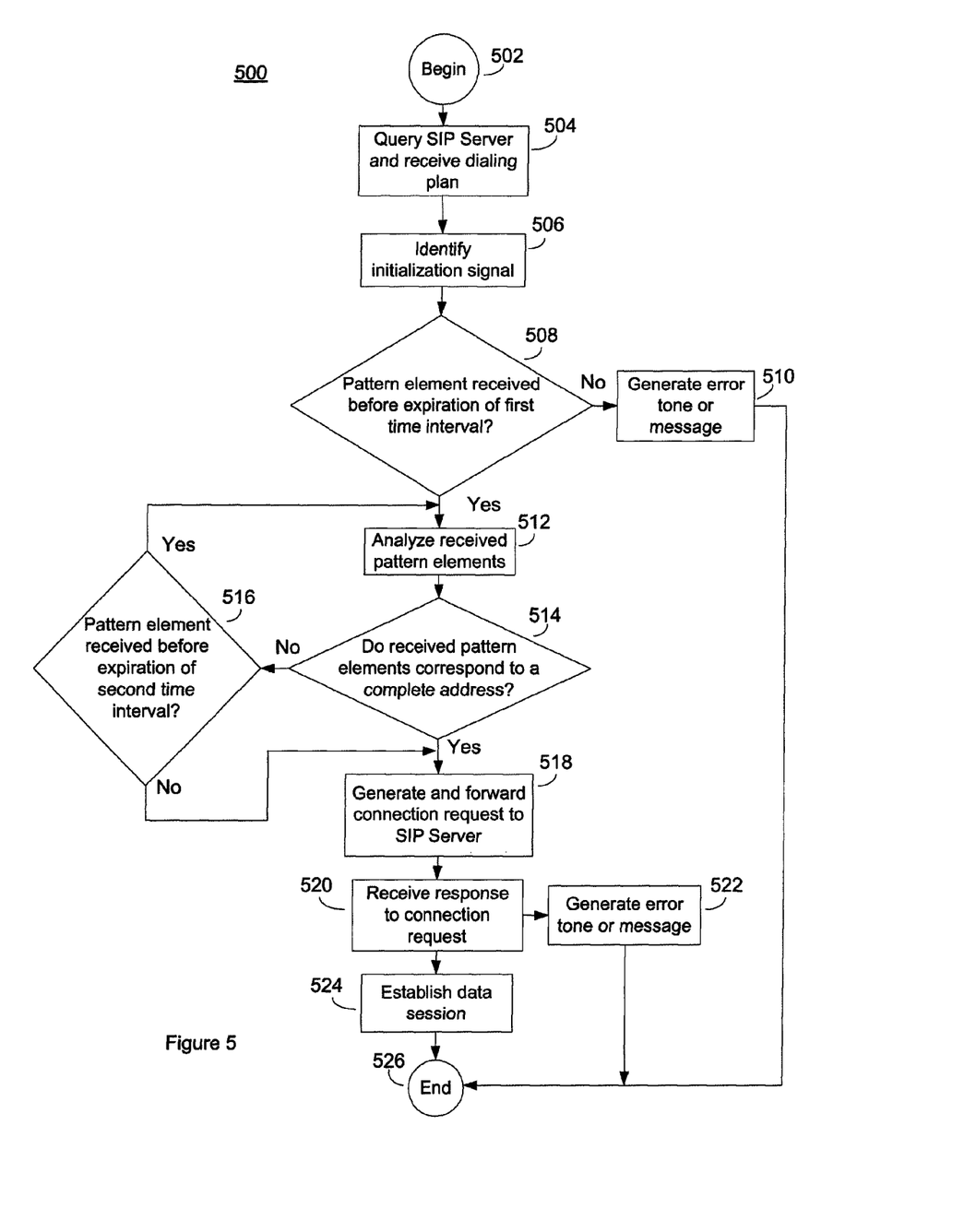
FIG. 5 is an exemplary flow diagram for variable dial pattern provisioning, according to an embodiment of the present invention.

FIG. 5 is an exemplary flow diagram for variable dial pattern provisioning, according to an embodiment of the present invention. FIG. 5 illustrates an exemplary flow diagram for analyzing pattern elements based on a dialing plan in order for the analysis module 408 to determine whether the received pattern elements correspond to a complete address. The flow diagram 500 may begin at 502 and may continue to 504.

In 504, the registration module 402 may query the SIP Server 122 for a dialing plan and may receive the dialing plan from the SIP Server 122. The registration module 402 may forward the dialing plan to the analysis module 408 for analyzing received pattern elements. The dialing plan also may be stored locally from a previous query or during manufacturing or programming of hardware, software, firmware, and/or combinations thereof of the SIP Device 110.

In 506, the initialization module 406 may identify an initialization signal in analog information received at the receiver module 404. The initialization module 406 may then instruct the buffer module 410 to clear any data stored in the buffer 420, and instruct the analysis module 408 to monitor and analyze any received pattern elements stored in the buffer 420. Additionally, the initialization module 406 may instruct the timer module 414 to start a first time interval, to monitor the end of the first time interval, and may instruct the tone module 412 to generate a tone for the User Interface 114.

In 508, the analysis module 408 may determine whether the receiver module 404 receives one or more pattern elements transmitted by the User Interface 114 before expiration of the first time interval. If the time interval expires, the flow diagram 500 may continue to 510. If the first time interval has not expired, the flow diagram 500 may continue to 512.

In 510, the analysis module 408 may instruct the tone module 412 to generate a tone or an audible or visual message for the User Interface 114 indicating that the data session cannot be established since no pattern elements have been received, and the flow diagram 500 may continue to 526 and end.

In 512, the analysis module 408 may analyze the one or more received pattern elements in the buffer 420 based on one or more matching rules to determine whether the one or more received pattern elements partially or completely match a format of a complete address or to determine whether an end-of-dialing pattern element is included in the received pattern elements.

If the one or more of the received pattern elements completely match a format of a complete address or if the end-of-dialing pattern element has been received, the flow diagram 500 may continue to 518. If the one or more received pattern elements do not correspond to a format of a complete address or do not completely match a format of the complete address, or if the end-of-dialing pattern element has not been received, the flow diagram 500 may continue to 516.

In 516, the analysis module 408 may determine whether the receiver module 404 receives another pattern element before the expiration of the second time interval. If another pattern element is received, the second time interval may be restarted and the flow diagram 500 may then continue to 512. If another pattern element is not received, the flow diagram 500 may then continue to 518.

In 518, the analysis module 408 may instruct the request module 416 to generate a connection request based on the one or more received pattern elements stored in the buffer 420. The request module 416 may then forward the connection request to the SIP Server 122, which may use the connection request to determine whether a data session may be established between the SIP User Agent 112 and the SIP Element 132, for example.

In 520, the request module 416 may receive a response to the connection request. The response may be a call control signal for establishing a data session between the SIP User Agent 112 and the SIP Element 132, for example, and the flow diagram 500 may continue to 524. Otherwise, the response may be an error message indicating that the pattern elements included in the connection request are not a proper complete address, and the flow diagram 500 may continue to 522.

In 522, the request module 416 may instruct the tone module 412 to generate an tone or an audible or visual error message for the User Interface 114 indicating that a data session may not be established based on the received pattern elements. For example, the message may indicate that the dialed telephone number does not correspond to a known telephone number. The flow diagram 500 may continue and end at 526.

In 524, the request module 416 may establish a data session with the SIP Element 132, for example, permitting the User Interface 114 to communicate with the SIP Element 132 over the IP network 124. The request module 416 also may instruct the tone module 412 to generate a tone or an audible or visual message indicating that the SIP Device 110 is waiting for a signal from the SIP Element 132. For example, the tone may indicate that user of the SIP Element 132 has not yet answered. Once the signal is received, analog information, such as, but not limited to, voice signals may be exchanged between the User Interface 114 and the SIP Element 132 over the IP network 124 until either the User Interface 114 or the SIP Element 132 ends the data session. The flow diagram 500 may then continue and end at 526.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   identifying an initialization signal;
   receiving one or more pattern elements after identifying the initialization signal;
   analyzing the one or more pattern elements based on an identified dialing plan to determine whether the one or more pattern elements correspond to a complete address, wherein the dialing plan comprises one or more matching rules and wherein the analyzing compares the one or more pattern elements for alternative matches within the one or more matching rules;
   forwarding the one or more pattern elements in a connection request to a server if the one or more pattern elements correspond to the complete address;
   identifying that the one or more pattern elements or a subsequence of the one or more pattern elements match a matching rule that identifies a command, wherein the command is based on the one or more matching rules in the dialing plan; and
   generating a tone or a response message based on the command.

2. The method of claim 1, wherein the one or more pattern elements correspond to the complete address if the one or more pattern elements satisfy the one or more matching rules.

3. The method of claim 1, further comprising:
   querying the server for the dialing plan; and
   receiving the dialing plan.

4. The method of claim 1, further comprising, when the analysis determines that the one or more pattern elements do not correspond to the complete address:
   receiving one or more additional pattern elements; and
   determining whether the one or more pattern elements and the one or more additional pattern elements correspond to the complete address.

5. The method of claim 1, wherein the complete address includes a destination address code.

6. The method of claim 1, wherein the complete address includes a destination address code and a modifier code.

7. The method of claim 6, wherein the modifier code comprises a feature access code, a facility access code, or a carrier access code.

8. The method of claim 1, wherein the analysis determines that the one or more pattern elements correspond to the complete address after an expiration of a predetermined amount of time.

9. The method of claim 1, further comprising:
   identifying an end-of-dialing pattern element in the one or more pattern elements; and
   determining that the one or more pattern elements correspond to the complete address based on the identified end-of-dialing pattern element.

10. The method of claim 1, further comprising inserting a pattern element based on the command.

11. The method of claim 1, further comprising identifying a service code based on the command.

12. The method of claim 1, further comprising monitoring a timer based on the command.

13. The method of claim 1, wherein the one or more pattern elements comprise digital representations of DTMF signals or digital representations of pulse dialing signals.

14. The method of claim 1, further comprising determining whether the one or more pattern elements correspond to an emergency call.

15. A non-transitory computer readable storage media comprising code to perform the acts of the method of claim 1.

16. A system comprising:
- an initialization processor to identify an initialization signal received from an communication device;
- a receiver communicatively coupled to the initialization processor and configured to receive one or more pattern elements after the initialization processor identifies the initialization signal;
- an analysis processor communicatively coupled to the receiver and configured to analyze the one or more pattern elements based on a dialing plan to determine whether the one or more pattern elements correspond to a complete address, the analysis processor further being configured to identify that the one or more pattern elements or a subsequence of the one or more pattern elements match a matching rule that identifies a command; and
- wherein the dialing plan comprises one or more matching rules and wherein the analysis processor compares the one or more pattern elements for alternative matches within the one or more matching rules, wherein the command is based on the one or more matching rules in the dialing plan, wherein the analysis processor is further configured to generate a tone or response message based on the command.

17. The system of claim 16, further comprising:
- a buffer to store the one or more pattern elements received by the receiver.

18. The system of claim 16, further comprising:
- a request processor to generate a connection request based on the one or more pattern elements if the analysis processor determines that the one or more pattern elements correspond to the complete address.

19. The system of claim 16, further comprising:
- a registration processor to query a server and to receive the dialing plan from the server.

20. A system comprising:
- a server;
- an gateway device communicatively coupled to a communication device and to the server, the gateway device comprising:
  - an initialization module to identify an initialization signal received from the communication device;
  - a receiver module communicatively coupled to the initialization module and configured to receive one or more pattern elements after the initialization module identifies the initialization signal; and
  - an analysis module communicatively coupled to the receiver module and configured to analyze the one or more pattern elements based on a dialing plan to determine whether the one or more pattern elements correspond to a complete address, the analysis module further being configured to identify that the one or more pattern elements or a subsequence of the one or more pattern elements match a matching rule that identifies a command, wherein the dialing plan comprises one or more matching rules and wherein the analysis module compares the one or more pattern elements for alternative matches within the one or more matching rules, wherein the command is based on the one or more matching rules in the dialing plan, wherein the analysis module is further configured to generate a tone or response message based on the command.

\* \* \* \* \*